(12) United States Patent
Pandit et al.

(10) Patent No.: US 8,595,263 B2
(45) Date of Patent: Nov. 26, 2013

(54) PROCESSING IDENTITY CONSTRAINTS IN A DATA STORE

(75) Inventors: Bhalchandra Pandit, Redmond, WA (US); Bassam Tabbara, Seattle, WA (US); Jeffrey B. Parham, Redmond, WA (US); Edward S. Miller, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 761 days.

(21) Appl. No.: 12/131,141

(22) Filed: Jun. 2, 2008

(65) Prior Publication Data

US 2009/0300033 A1 Dec. 3, 2009

(51) Int. Cl.
*G06F 17/30* (2006.01)

(52) U.S. Cl.
USPC ............................................. 707/802

(58) Field of Classification Search
USPC ............................................. 707/802
See application file for complete search history.

(56) References Cited

U.S. PATENT DOCUMENTS

| | | | |
|---|---|---|---|
| 5,710,881 A * | 1/1998 | Gupta et al. .................. | 709/200 |
| 7,043,487 B2 | 5/2006 | Krishnamurthy et al. | |
| 7,174,327 B2 * | 2/2007 | Chau et al. .................... | 1/1 |
| 7,318,063 B2 | 1/2008 | Brychell et al. | |
| 8,438,542 B2 * | 5/2013 | Nandan et al. ................ | 717/121 |
| 8,447,788 B2 * | 5/2013 | Liu et al. ...................... | 707/802 |
| 2003/0074636 A1 * | 4/2003 | Manepalli .................... | 715/513 |
| 2005/0044113 A1 * | 2/2005 | Manikutty et al. ......... | 707/104.1 |
| 2005/0165866 A1 * | 7/2005 | Bohannon et al. ........... | 707/203 |
| 2005/0262115 A1 | 11/2005 | Hu et al. | |
| 2006/0041838 A1 * | 2/2006 | Khan ........................... | 715/513 |
| 2006/0064432 A1 * | 3/2006 | Pettovello ................. | 707/103 X |
| 2006/0085451 A1 | 4/2006 | Pal et al. | |
| 2006/0101073 A1 * | 5/2006 | Popa et al. .................. | 707/104.1 |
| 2006/0106837 A1 * | 5/2006 | Choi ............................. | 707/101 |
| 2007/0112851 A1 * | 5/2007 | Tomic et al. ............... | 707/104.1 |
| 2007/0236224 A1 * | 10/2007 | Augustyniak et al. ......... | 324/425 |
| 2007/0250766 A1 * | 10/2007 | Medi et al. .................... | 715/513 |
| 2007/0271305 A1 * | 11/2007 | Chandrasekar et al. ...... | 707/200 |
| 2008/0016122 A1 * | 1/2008 | Liu et al. ....................... | 707/200 |
| 2008/0216052 A1 * | 9/2008 | Hejlsberg et al. ............. | 717/114 |
| 2009/0112890 A1 * | 4/2009 | Medi et al. .................... | 707/100 |

FOREIGN PATENT DOCUMENTS

WO 2007013079 A3 2/2007

OTHER PUBLICATIONS

"SML WG in W3C: First F2F Meeting", http://blogs.technet.com/pratul/default.aspx.
"XMLSpy Relational Database Integration", http://www.altova.com/features_database.html.
"Identity-Constraint Definitions", http://www.stylusstudio.com/w3c/schema1/cIdentity-constraint_Definitions.htm.
Ravi Murthy, "From Trees to Graphs: Evolving XML for Enterprise Applications", May 15-18, 2007, pp. 1-11.
"Service Modeling Language", http://www.serviceml.org/.

* cited by examiner

*Primary Examiner* — Robert Beausoliel, Jr.
*Assistant Examiner* — Noosha Arjomandi

(57) ABSTRACT

Various technologies and techniques are disclosed for processing identity constraints in a relational database. Values are extracted from an XML document during a submit operation. References that potentially participate in an identity constraint are identified. The reference information is stored. An identity constraint graph is generated from the stored reference information. Techniques for facilitating key-sequence comparisons are described. Techniques for identifying violations to identity constraints are described. Techniques for identifying which identity constraint graphs are affected by a new or changed document are described.

4 Claims, 12 Drawing Sheets

230

```
┌─────────────────────────────────────────────────────────┐
│ FOR EACH FIELD IN A KEY-SEQUENCE, CONVERT ITS TYPED VALUE │
│        AND ITS NORMALIZED TYPE TO CANONICAL FORM         │
│                          232                             │
└─────────────────────────────────────────────────────────┘
                              │
                              ▼
┌─────────────────────────────────────────────────────────┐
│           CONCATENATE VALUES IN SPECIFIC ORDER           │
│                          234                             │
└─────────────────────────────────────────────────────────┘
                              │
                              ▼
┌─────────────────────────────────────────────────────────┐
│       STORE CONCATENATED VALUE IN SINGLE INDEXED COLUMN  │
│                          236                             │
└─────────────────────────────────────────────────────────┘
                              │
                              ▼
┌─────────────────────────────────────────────────────────┐
│   PERFORM QUERY TO COMPARE VALUES IN SINGLE INDEXED      │
│              COLUMN DURING VALIDATION                    │
│                          238                             │
└─────────────────────────────────────────────────────────┘
```

FIG. 5

PROCESSING IDENTITY CONSTRAINTS IN A DATA STORE

BACKGROUND

The Extensible Markup Language (XML) is a specification for creating custom markup languages. XML is an extensible language because it allows users to define their own elements. The primary purpose of XML is to facilitate the sharing of structured data across different information systems, such as the Internet. XML Schema offers facilities for describing the structure and constraining the content of XML documents. The scope of the constraints defined using XML Schema is limited to a single document. An extension of XML Schema called Service Modeling Language (SML) has been developed. SML allows defining constraints that span multiple documents.

Both XML and SML support identity constraints. Identity constraints are used to specify the uniqueness and reference constraints for one or more elements and attributes contained within the XML or SML document. For example, if a data element called "LegalName" must be unique across all records contained in the document, then an identity constraint can be assigned to that data element to allow the uniqueness requirement to be enforced by a database or other system that ends up processing the document later.

Because SML allows constraints to span multiple documents, it can be resource intensive for databases to process SML documents and enforce applicable identity constraints.

SUMMARY

Various technologies and techniques are disclosed for processing identity constraints in a data store. Values are extracted from an XML document during a submit operation. First level out-references are identified. References that potentially participate in an identity constraint are identified. The reference information is stored. An identity constraint graph is generated from the stored reference information.

In one implementation, a method for facilitating key-sequence comparisons is described. The typed value and the corresponding normalized type of a field are converted to a canonical form. The canonical form of all fields in a key-sequence is concatenated into a single value in a pre-determined order. The concatenated canonical form is stored for later use during a validation process. The converting, concatenating, and storing steps are repeated for each key-sequence. During the validation process, the stored key-sequence values are compared as a part of identity constraint enforcement.

In another implementation, a method for identifying violations to identity constraints is described. Values are extracted from an XML document. Potential members of a target node set are identified. Field instances of each key-sequence in the target node set are retrieved. Condition checks are performed on the field instances. A result of the condition checks is stored for later use during validation of identity constraints. During the validation process, the stored results are consulted to locate any condition checks that did not pass.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 5 is a process flow diagram for one implementation illustrating the stages involved in performing key sequence comparisons.

FIG. 11 is a diagrammatic view for one implementation that illustrates a storage table that can be utilized to determine which identity constraint graph a given document participates in.

DETAILED DESCRIPTION

Figure 1:
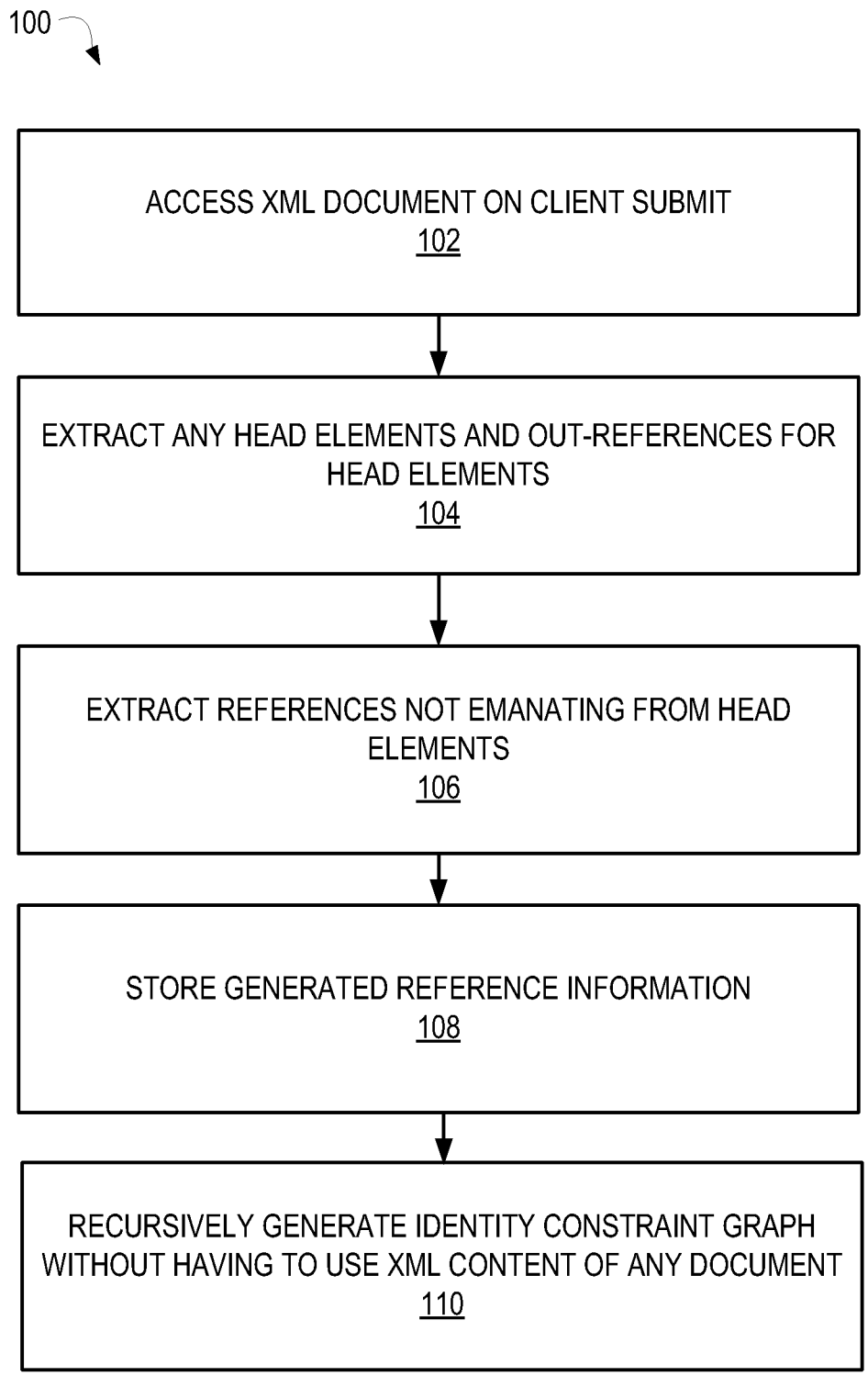
FIG. 1 is a process flow diagram for one implementation that illustrates the stages involved in generating an identity constraint graph.

The technologies and techniques herein may be described in the general context as an application for processing identity constraints in a relational database, but the technologies and techniques also serve other purposes in addition to these. In one implementation, one or more of the techniques described herein can be implemented as features within a database program such as MICROSOFT® SQL Server, or from any other type of program or service that is responsible for processing SML or XML documents and evaluating identity constraint conditions.

SML is an extension to XML schema. All SML instance documents are also XML documents by definition. As described in the background section, SML identity constraints are similar to XML identity constraints. However, their target node-set can span multiple documents unlike their XML counterpart. In other words, the nodes that are affected by an SML identity constraint can be contained in more than one document. When SML identity constraints are to be implemented using a data store such as a relational database (or any large scale store), there are several issues that can arise.

One issue that can arise when processing SML documents into a relational database is that the selector xpath of an SML identity constraint can contain deref( ) calls. The dref( ) function is an xpath extension function that allows one to determine and retrieve the target of an SML reference. In other words, this means that the target node-set can span multiple documents forming a connected graph of elements. This graph is rooted at the head element. The root of this graph is called the head element. The set of leaf elements is called the target node set. The set of documents containing leaf elements in this graph is called the target document set. This connected graph of elements is called an "identity constraint graph". The first step in validating an SML identity constraint is computing the target document set. To compute the target document set, the identity constraint graph is first constructed and traversed. To do this, the traversing starts at the head element. The chain of references defined by the selector xpath is then followed. Computing the target document set in an identity constraint graph efficiently can be difficult for larger databases, such as databases that may have millions of documents. This is because the stored XML document must generally be accessed at the graph generation time. The current invention obviates the need to access the XML document content at graph generation time.

A second issue that can arise when processing SML documents in relational databases is that computing and comparing a large number of key-sequences efficiently can be difficult. Each member of a key-sequence is called a field. An identity constraint could be defined to require fields to exist and have unique values for the containing key-sequences. A key-sequence is compared with another using pair-wise typed comparison of the corresponding field instance values. Any key-sequence that does not have a unique value causes a constraint violation. Efficiently validating the restrictions of key-sequences across a set of millions of XML documents stored in a database can be quite challenging.

A third issue that can arise when processing SML documents in a relational database is that the fields of key-sequences that are defined for identity constraints must satisfy certain conditions, and these conditions must be validated by the database. As noted earlier, each member of a key-sequence is called a field. In one implementation, the set of conditions that each field must satisfy include: ensuring that each field evaluates to zero or 1 value, each field's type is a simple-type, and each key-sequence is fully specified. If any field/key-sequence fails one or more of these tests, it causes a constraint violation. Efficiently determining whether these field conditions are met for an SML identity constraint across a set of millions of XML documents stored in a database can also be quite challenging.

A fourth issue that arises when processing SML documents with a relational database is that when new documents are added or existing ones are modified, checks must be performed during a submit operation to see if the new/updated documents violate any identity constraint(s). All known identity constraints can be checked at submit time (when the document is being submitted to the database), but it can quickly get very expensive when there are a large number of documents and many applicable identity constraints in the store. It would be wasteful and unnecessary to evaluate constraints that are not affected by a given change. Efficiently determining the set of identity constraints that need to be evaluated as a result of a change can be difficult.

In one implementation, an identity constraint processing system is described. The identity constraint process system has techniques for generating an identity constraint graph efficiently, for performing key-sequence comparisons efficiently, for performing field tests efficiently, and for efficiently determining whether new or changed documents affect any identity constraints.

Turning now to FIGS. 1-11, the stages for implementing one or more implementations of an identity constraint processing system are described in further detail. In some implementations, the processes of FIG. 1-11 are at least partially implemented in the operating logic of computing device 500 (of FIG. 12).

FIG. 1 is a process flow diagram 100 for one implementation that illustrates the stages involved in generating an identity constraint graph. On client submit of an XML document, the document is accessed (stage 102) so needed information can be extracted as described herein. In other words, when a client computer submits an XML document to the database for processing, the XML document is read and information extracted from it.

Any head elements are extracted from the document, if any exist (stage 104). Any out-references for the head elements are also extracted (stage 104). In one implementation, this is determined by applying the first selector xpath token to the head element to get the first level out-references. Each identity constraint has a property called "selector" which is expressed in the form of an Xpath expression. A complete example of applying the first selector xpath token to the head element to the get the first level out-references is provided in a later section. Any references that do not emanate from the head elements are also extracted (stage 106). In one implementation, this is performed by applying the second and later selector tokens to get the references that potentially participate in an identity constraint graph. The generated reference information is stored (stage 108), such as on a server. The identity constraint graph is recursively generated from the stored reference information, without having to use XML content of any document (stage 110).

An example will now be provided to further illustrate this process, and reference will be made to FIGS. 2 and 3 in describing this example. The schema below defines an identity constraint TargetChildCompoundKey and the structure of Source*, Middle* and Target* elements that are used in the instance documents that follow.

```
<xs:schema targetNamespace="urn:s1" xmlns:tns="urn:s1"
      elementFormDefault="qualified"
  xmlns:xs="http://www.w3.org/2001/XMLSchema"
      xmlns:sml="http://schemas.serviceml.org/sml/2007/02"
  xmlns:smlfn="http://schemas.serviceml.org/sml/function/2006/07">
    <xs:import namespace="http://schemas.serviceml.org/sml/2007/02" />
    <xs:element name="SourceChild">
      <xs:annotation>
        <xs:appinfo>
          <sml:key name="TargetChildCompoundKey">
            <sml:selector
  xpath="smlfn:deref(smlfn:deref(tns:RefElement)/tns:MiddleChild)/
  tns:TargetChild" />
            <sml:field xpath="tns:Element" />
            <sml:field xpath="@tns:Attribute" />
          </sml:key>
        </xs:appinfo>
      </xs:annotation>
      <xs:complexType>
        <xs:sequence>
          <xs:element name="RefElement" type="sml:refType"
  maxOccurs="unbounded"/>
        </xs:sequence>
      </xs:complexType>
    </xs:element>
    <xs:element name="SourceRoot">
      <xs:complexType>
        <xs:sequence>
          <xs:element ref="tns:SourceChild" />
        </xs:sequence>
      </xs:complexType>
    </xs:element>
    <xs:element name="MiddleRoot">
      <xs:complexType>
```

```
        <xs:sequence>
            <xs:element name="MiddleChild" type="sml:refType"
maxOccurs="unbounded"/>
        </xs:sequence>
    </xs:complexType>
</xs:element>
<xs:element name="TargetRoot">
    <xs:complexType>
        <xs:sequence>
            <xs:element name="TargetChild" maxOccurs="unbounded">
                <xs:complexType>
                    <xs:sequence>
                        <xs:element name="Element"
type="xs:string" />
                    </xs:sequence>
                    <xs:attribute name="Attribute" type="xs:int"
use="required" form="qualified"/>
                </xs:complexType>
            </xs:element>
        </xs:sequence>
    </xs:complexType>
</xs:element>
</xs:schema>
```

The following 7 instance documents are based on the schema presented earlier. Each document is preceded by its path in the store. For example, the path of the first document is '/s'.

```
Document '/s' :
-----------------
<x:SourceRoot xmlns:x='urn:s1'>
    <x:SourceChild>
        <x:RefElement sml:ref="true">
            <sml:uri>/m1.xml</sml:uri>
        </x:RefElement>
        <x:RefElement sml:ref="true">
            <sml:uri>/m2.xml</sml:uri>
        </x:RefElement>
    </x:SourceChild>
</x:SourceRoot>
Document '/m1' :
-----------------
<x:MiddleRoot xmlns:x='urn:s1'>
    <x:MiddleChild sml:ref="true">
        <sml:uri>/t11.xml</sml:uri>
    </x:MiddleChild >
    <x:MiddleChild sml:ref="true">
        <sml:uri>/t12.xml</sml:uri>
    </x:MiddleChild >
    <x:MiddleChild sml:ref="true">
        <sml:uri>/t13.xml</sml:uri>
    </x:MiddleChild >
</x:MiddleRoot>
Document '/m2' :
-----------------
<x:MiddleRoot xmlns:x='urn:s1'>
    <x:MiddleChild sml:ref="true">
        <sml:uri>/t21.xml</sml:uri>
    </x:MiddleChild >
</x:MiddleRoot>
Document '/t11' :
-----------------
<x:TargetRoot xmlns:x='urn:s1'>
    <x:TargetChild x:Attribute="11">
        <x:Element>v11</x:Element>
    </x:TargetChild>
</x:TargetRoot>
Document '/t12' :
-----------------
<x:TargetRoot xmlns:x='urn:s1'>
    <x:TargetChild x:Attribute="12">
        <x:Element>v12</x:Element>
    </x:TargetChild>
</x:TargetRoot>
Document '/t13' :
-----------------
<x:TargetRoot xmlns:x='urn:s1'>
    <x:TargetChild x:Attribute="12">
        <x:Element>v13</x:Element>
    </x:TargetChild>
</x:TargetRoot>
Document '/t21' :
-----------------
<x:TargetRoot xmlns:x='urn:s1'>
    <x:TargetChild x:Attribute="21">
        <x:Element>v21</x:Element>
    </x:TargetChild>
</x:TargetRoot>
```

Note that in subsequent descriptions, the '/' part has been omitted from the document path for brevity. That is, t11 is used instead of '/t11'. Identity constraint TargetChildCompoundKey is defined on the SourceChild element in document s. It points to documents m1 & m2 which in turn point to documents t11, t12, t13 and t21.

Figure 2:
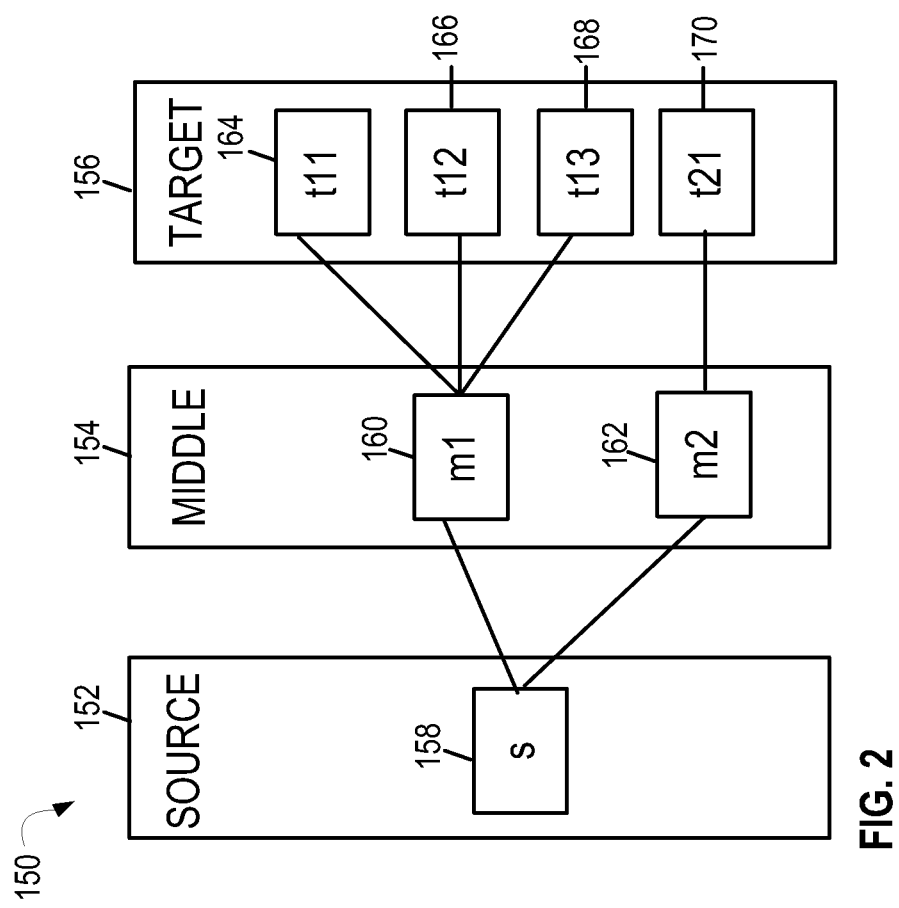
FIG. 2 is a diagrammatic view for one implementation that illustrates an exemplary identity constraint graph.
Figure 3:
FIG. 3 is a diagrammatic view for one implementation that illustrates a tokenized selector that facilitates graph traversal.

FIG. 2 is a diagrammatic view for one implementation that illustrates the resultant identity constraint graph for the example shown above. The identity constraint graph 150 shows three sets of documents. The source set 152 consists of the single document that contains the head element. The middle set 154 consists of documents corresponding to selector token #2 (tns:MiddleChild). The target set 156 consists of documents corresponding to selector token #3 (tns:TargetChild). The target set 156 contains the target node set.

To facilitate graph traversal, the selector xpath of the TargetChildCompoundKey identity constraint is tokenized. Tokenization is the process by which a selector Xpath expression is split into tokens at deref( ) boundary. For example, "deref(x)/y" gets tokenized into two tokens: x and y. Similarly, "deref(deref(x)/y)/z" gets tokenized into three tokens: x, y, and z. FIG. 3 is a diagrammatic view 180 that shows the result of tokenizing the selector xpath of the TargetChildCompoundKey identity constraint. Diagrammatic view 180 shows a token number column 182, a token column 184, and a deref indicator column 186 for the selector xpath 194 "Smlfn:deref(smlfn:deref(tns:RefElement)/tns:MiddleChild)/tns:TargetChild" from the earlier example.

With continued reference to FIG. 2, deref( ) is called for each RefElement child of SourceChild element in document s (158). This yields two MiddleRoot elements, one each from document m1 (160) and m2 (162). deref( ) is called on the MiddleChild elements under the MiddleRoot elements obtained previously. This yields four TargetRoot elements t11 (164), t12 (166), t13 (168) and t21 (170). The tns:TargetChild xpath is applied to the four TargetRoot elements obtained previously. This yields four TargetChild elements which constitute the target node set.

The identity constraint reference information described in the example above can be extracted on the client during a submit operation and then stored on the server. This allows the identity constraint graph to be generated without having to access the XML content of the documents participating in the graph. In one implementation, this speeds up graph traversal substantially.

Information can be stored about two types of references that are used during graph traversal. The first type of reference includes references that emanate from a descendant (or self as appropriate) of the head element. These are the references corresponding to selector token number 1 (188 in FIG. 3). The second type of reference used for graph traversal includes references corresponding to selector token number 2 onwards (190 and 192 in FIG. 3). In other words, this includes references other than the ones which start at a head element.

Figure 4:
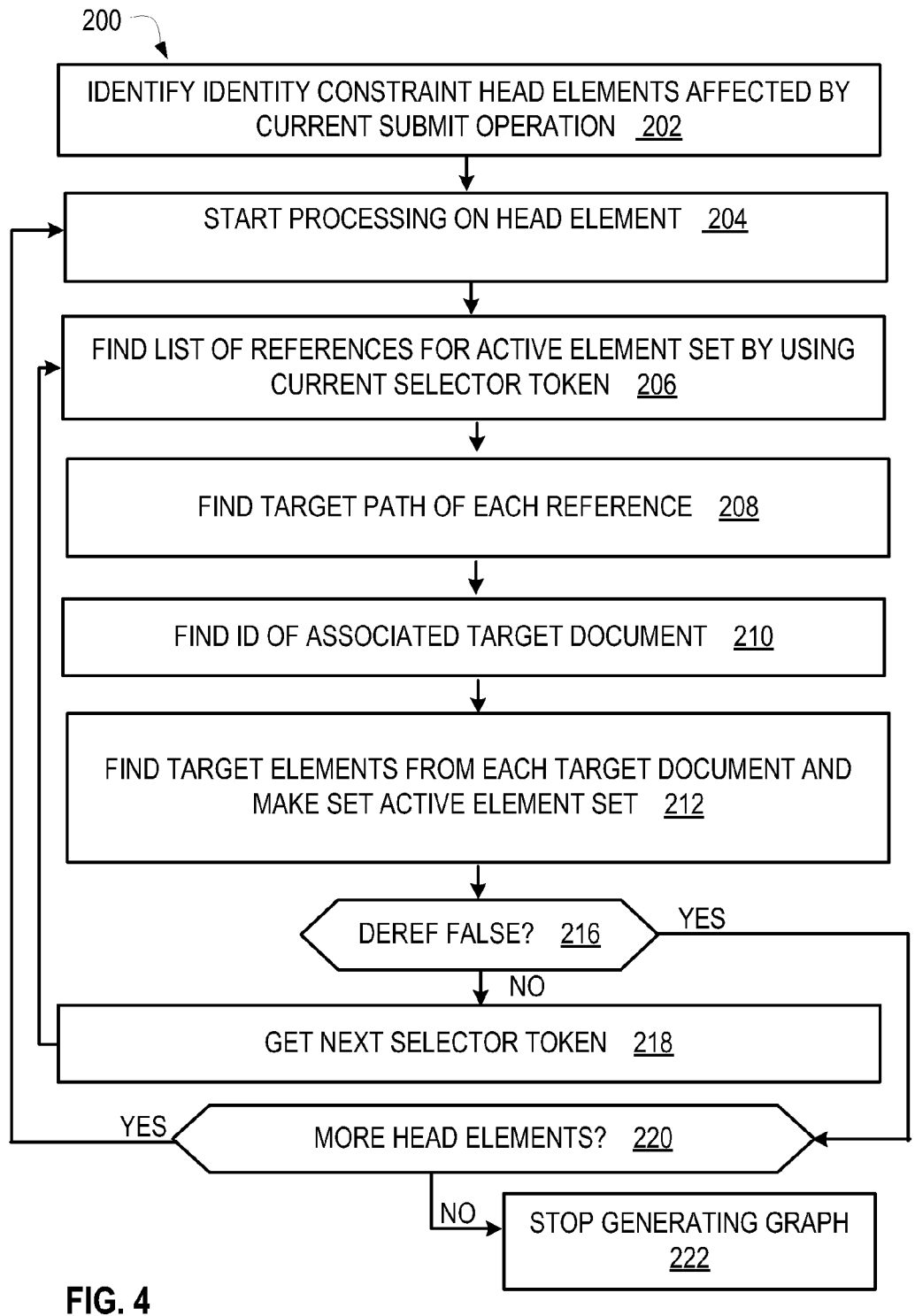
FIG. 4 is a process flow diagram for one implementation illustrating the stages involved in traversing an identity constraint graph.

Once the client has generated all the needed information and stored it at the server, traversing the identity constraint graph at the server is performed, as described in the process flow diagram 200 of FIG. 4. The identity constraint head elements that are affected by the current submit operation are identified (stage 202). Processing is started on the head element (stage 204), with the current selector token being set to token #1 and the head element being added to the active element set. A list of references is found for the active element set (stage 206) by using the current selector token. The target path is found of each reference found in stage 206 (stage 208). The ID of the associated target document is found (stage 210). The target elements are found from each target document, and this set is made the active element set (stage 212).

If the deref value is false for the current selector token (decision point 216), then processing continues for more head elements (decision point 220). If the deref value is not false for the current selector token (decision point 216), then the next selector token is retrieved (stage 218), and then processing repeats with finding the list of references for the active element set by using the current selector token (stage 206). Once there are no more head elements to process (decision point 220), then the generation of the graph stops (stage 222). When the graph generation process ends, all identity constraint graphs have been generated that can be used for evaluating identity constraints on document submit operations.

In one implementation, by extracting the identity constraint information upon client submit and then storing the extracted information on the server, some additional issues can be addressed that otherwise may have arisen with certain database implementations. For example, to compute the set of elements to be de-referenced and the reference elements under the head element at evaluation time, some implementations use a column that is associated with a schema collection. The index generation and maintenance on such a column in a database can be expensive and reduce insert performance for some implementations. Another example issue that can arise in some implementations is that computing the set of reference target documents at evaluation time may involve a join to reference table on a varchar(max) column (that stores element xpaths). Some reference tables may already be a performance bottleneck, and computing a set of reference target documents at evaluation time could make the bottleneck on the reference table worse for some implementations. Thus, by extracting the identity constraint information on client submit and then storing the information on the server, some of these issues can be avoided in certain implementations.

Figure 6:
FIG. 6 is a diagrammatic view for one implementation that illustrates exemplary concatenated string values generated according to the process of FIG. 5.

Turning now to FIGS. 5 and 6, an implementation will be described for enabling key-comparisons to be performed. FIG. 5 is a process flow diagram 230 for one implementation illustrating the stages involved in performing key sequence comparisons. In one implementation, stages 232 and 234 are performed on a client side, and stages 236 and 238 are performed on a database server.

For each field in a key-sequence, its typed value and its normalized type are converted to a canonical form (stage 232). The term "canonical form" means that each specific field value with a given type is always converted to the same form. The values are then concatenated, such as in the order they are defined in schema document (stage 234). Note that this is only a non-limiting example provided for the sake of illustration. Any order will work as long as the same order is used for all key-sequences. In one implementation, the concatenated values are stored in a single indexed column (stage 236). A database query can then be performed to compare values in a single indexed column during validation (stage 238). In other words, a database query can then be used to perform the key-sequence comparisons efficiently, which will be illustrated further with an example.

The following SML identity constraint will be used as an example. It defines two fields: name & age. The two fields taken together form the key-sequence definition.

```
<sml:unique name="TargetDerefChildMustBeUnique">
    <sml:selector xpath="smlfn:deref(tns:TargetRef)/tns:Child" />
    <sml:field xpath="@tns:name" />
    <sml:field xpath="@tns:age" />
</sml:unique>
```

The following document has test data used in the description that follows.

Document: "/target1.xml"

```
<x:TargetRoot xmlns:x="urn:s1">
    <x:Child x:name="Alice" x:age="10" />
    <x:Child x:name="Bob" x:age="10" />
    <x:Child x:name="Charlie" x:age="12" />
</x:TargetRoot>
```

Each field value is retrieved and converted to a canonical form (such as a canonical string form or binary form). The actual format of the form is not very important as long as it is consistent. That is, any specific value with a given type always gets converted to the same form. All field values of a key-sequence are concatenated separated by a separator that cannot occur in valid data.

Next, the base-most simple type is found for each field value encountered and that type is converted to its type-code. Thus, if there are two values, one with xs:int type and the other with a type derived from xs:int, both will yield the same type-code. This is handled correctly for all simple types supported in the SML identity constraint specification. In one implementation, all such type-codes are concatenated and separated by a separator.

The joined type-codes and the joined values are concatenated into a single item. This item is then prefixed with the field count and is sent by the client side to the database server for storage.

The table 270 shown in FIG. 6 shows how this works for the "/target1.xml" document given above. Note that table 270 uses ',' as the separator for better visual separation. Some implementations do not use ','.

In one implementation, these client-generated values and their hashes are stored in an IdentityConstraintFieldData table. When evaluating a constraint, the system only needs to look at the key-sequence values in this table. This means that information does not need to be extracted from the document on the fly, which can greatly improve performance.

In one implementation, regardless of the number of fields defined for an identity constraint, their values are stored in a single column. This simplifies the database table structure. Without this approach, a separate table may need to be created per number of fields. For example, one table for identity constraints with one field, one table for identity constraints with two fields and so on. But any other variation that would enable simple database queries to perform key-sequence comparisons efficiently could also be used.

Figure 7:
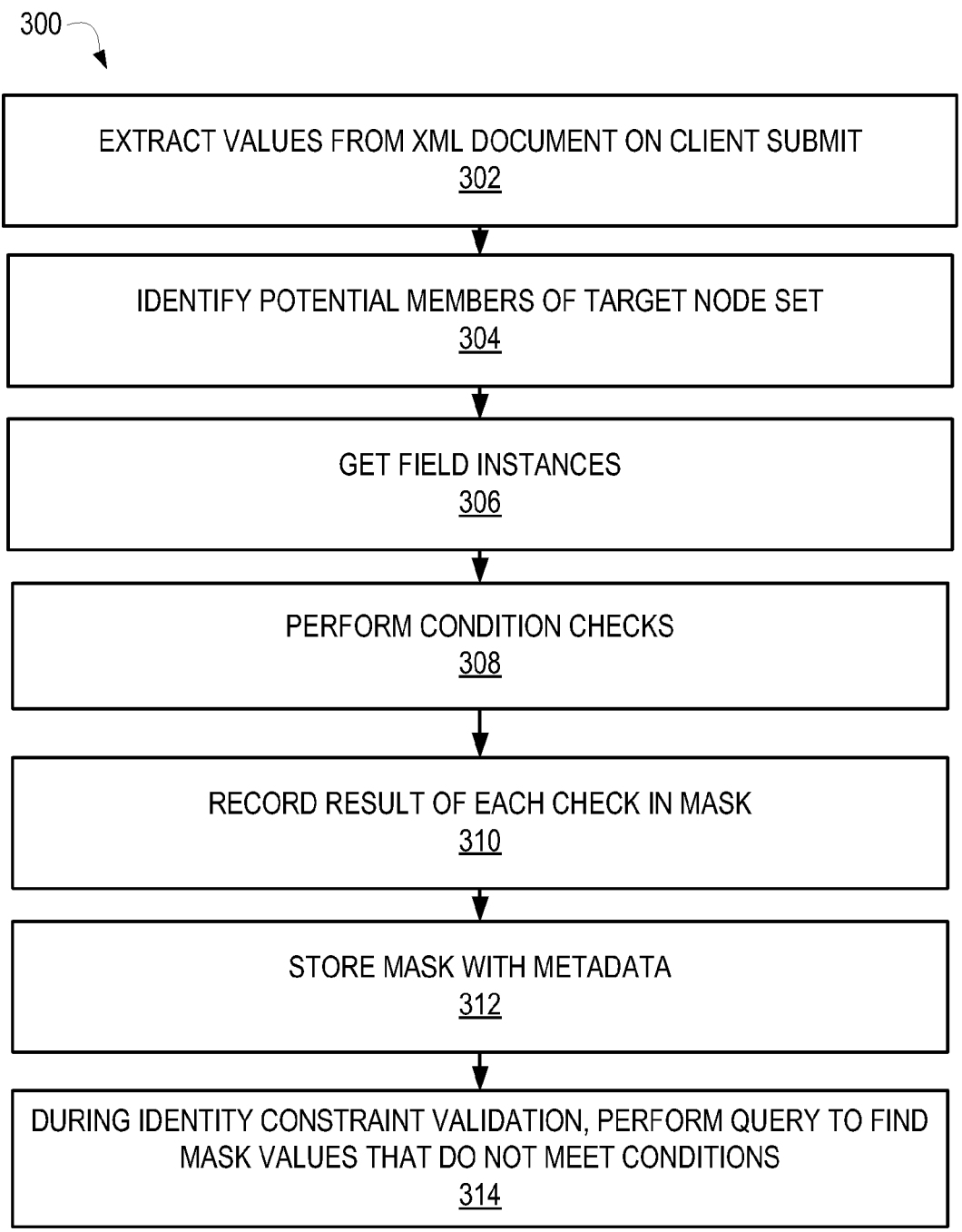
FIG. 7 is a process flow diagram for one implementation that illustrates some exemplary stages involved in performing identity constraint validation.

Turning now to FIG. 7, an implementation is described that facilitates the performance of field checks FIG. 7 is a process flow diagram 300 for one implementation that illustrates the stages involved in performing identity constraint field validation checks. Values are extracted from an XML document on a client submit operation (stage 302). In one implementation, this is performed by applying the last selector token xpath to the document root element to get potential members of the target node set (stage 304). Field instances are retrieved (stage 306). In one implementation, this is performed by applying the field xpath to each member of the target node set.

Condition checks are performed on each field instance (stage 308). In one implementation, the following three condition checks are performed. First, a check is made to see if each field evaluates to zero or one value. In other words, there cannot be two or more values for a field. Second, a check is made to see if each field's type is a simple-type. In other words, the field cannot be of a complex type. Third, a check is made to see if each key-sequence is fully specified. In other words, it is checked whether all of the fields are present in a key-sequence. In other implementations, there can be additional, fewer, or different condition checks that are performed. These three are described for the sake of illustration.

Once the condition checks are performed (stage 308), the results are recorded for each check in a mask (stage 310) or other suitable storage format. For example, the mask can be a single bit that utilizes very little storage space. The mask (or other format) is stored with metadata (stage 312). During the identity constraint validation, a query is performed to find the mask (or other stored representation) values that do not meet the conditions (stage 314). In other words, a query can be performed to return a list of fields that failed the condition checks. In one implementation, stages 302, 304, 306, 308 and 310 are performed on the client side and stages 312 and 314 are performed on the data store side. Other variations are also possible. An example will now be provided to further illustrate this process.

The following SML identity constraint will be used as an example. It defines two fields: name & age. The two fields taken together form the key-sequence definition. In this example, both fields must be present in an instance. In other words, the key-sequence formed by name & age must be fully specified.

```
<sml:key name="TargetDerefChildMustBeKey">
    <sml:selector xpath="smlfn:deref(tns:TargetRef)/tns:Child" />
    <sml:field xpath="@tns:name" />
    <sml:field xpath="@tns:age" />
</sml:key>
```

The following document has test data used in the description that follows.

Document: "/target1.xml"

```
<x:TargetRoot xmlns:x="urn:s1">
    <x:Child x:name="Alice" x:age="10" />
    <x:Child x:name="Bob" x:age="10" />
    <x:Child x:name="Charlie" /> <!-Note: age attribute is absent -->
</x:TargetRoot>
```

The stages mentioned earlier in FIG. 7 are performed on this test document as described below:

Information from the document ("/target1.xml") is extracted on the client (stage 302) and the last selector token xpath ("tns:Child") is applied to get potential members of the target node set (stage 304). This yields the three instances of the Child element.

The field xpaths ("@tns:name" & "@tns:age") are applied to get field instances (stage 306). This gives three key-sequences: (Alice, 10), (Bob, 10), (Charlie, ).

The condition checks are performed (stage 308), such as the three described above. In this example, the first two checks will succeed for all fields. The third one fails for the third key-sequence since one of the fields is missing value and therefore the key-sequence is not fully specified.

The result of each check is recorded as a single bit in a mask (stage 310), or is otherwise recorded appropriately. The mask is stored with appropriate metadata in the data store (stage 312). During identity constraint validation, the appropriate query is performed to find mask values that indicate failed condition checks (stage 314).

In other words, as described above, each condition is checked when the field value is extracted on the client. If any violation is found, that violation is recorded as a bit in a flag. If there are no violations the flag value is 0. This flag value is stored on the server. When a constraint is validated, a query is run that locates any rows corresponding to the leaf nodes for the current graph for which the flag is non-zero. In real world scenarios, this query has very high selectivity because the flag value is 0 for almost all rows. The constraint fails if any such rows with a non-0 flag are found. As noted earlier, in other implementations, database values other than single bit masks can be used and can still benefit from the techniques described herein. Similarly, while 0 and 1 are used herein to indicate no and yes, the opposite could also be used, or any other manner of representing a true or false or yes or no outcome could be utilized.

Note that in one implementation, a document cannot automatically be rejected or fail a submit on the client just because a 0 flag is found. This is because it is not known for sure, on the client, if a document actually participates in a constraint.

In one implementation, by storing the result of multiple condition checks in a single flag allows us to check for all conditions in a single operation. Further, this operation uses a single stored procedure across all identity constraints (instead of a separate dynamic T-SQL per identity constraint) which helps improve performance.

Turning now to FIGS. 8-11, some techniques are described for checking only those identity constraints that are affected by a current submit operation. In general, the implementation involves optimally storing parts of an identity constraint graph generated in some prior submit and using that information subsequently to detect if that graph is affected by a given change.

Figure 8:
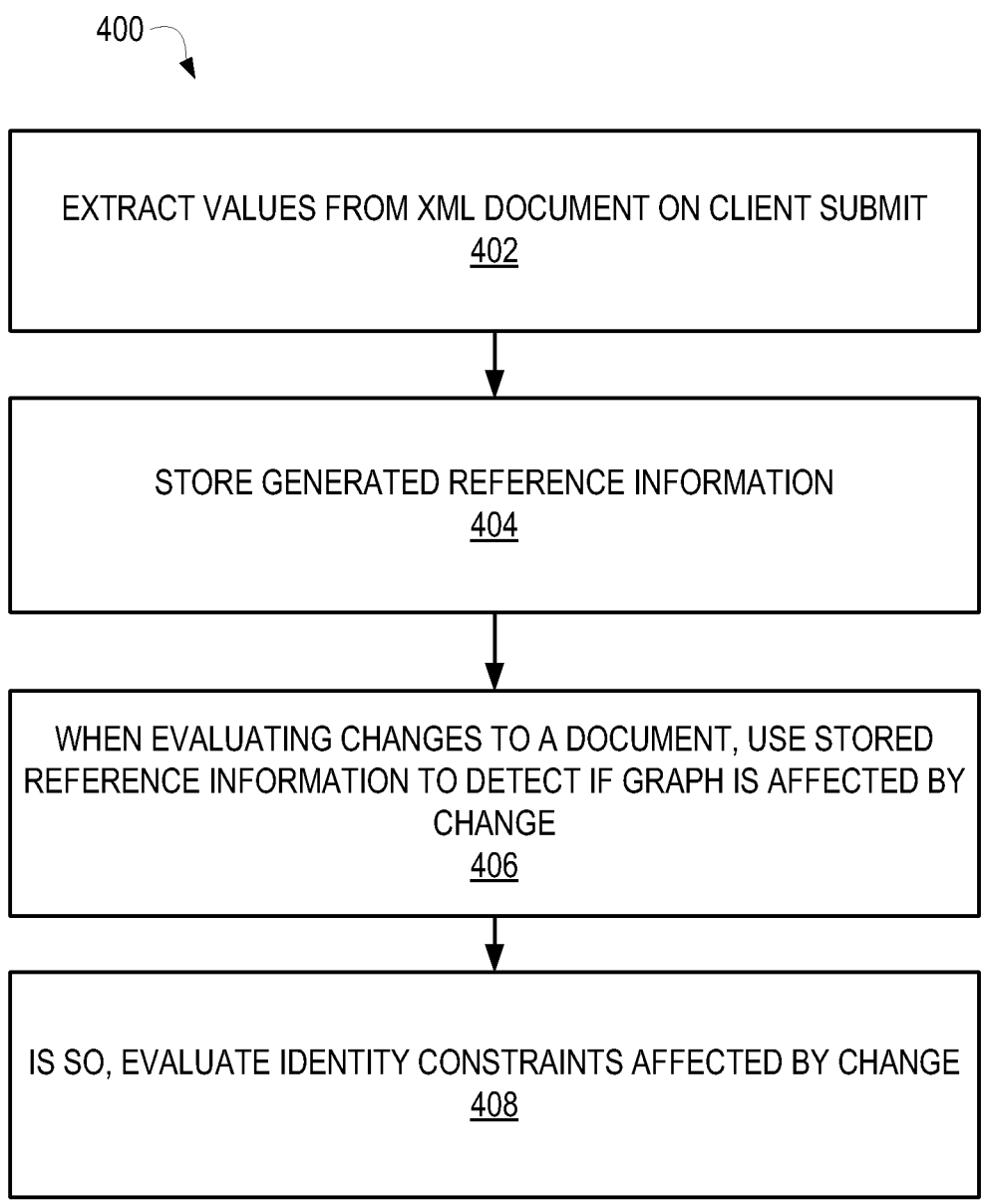
FIG. 8 is a process flow diagram for one implementation that illustrates the stages involved in checking only those identity constraints that are affected by the new or changed documents in the current submit operation.

FIG. 8 is a process flow diagram 400 for one implementation that illustrates the stages involved in checking only those identity constraints that are affected by the new or changed documents in the current submit operation. Values are extracted from an XML document on a client submit operation (stage 402). The generated reference information is stored (stage 404). When evaluating changes to a document, the stored reference information is used to detect if the graph is affected by a change (stage 406). If the graph is affected by the change, then the identity constraints affected by the change are evaluated (stage 408).

Figure 9:
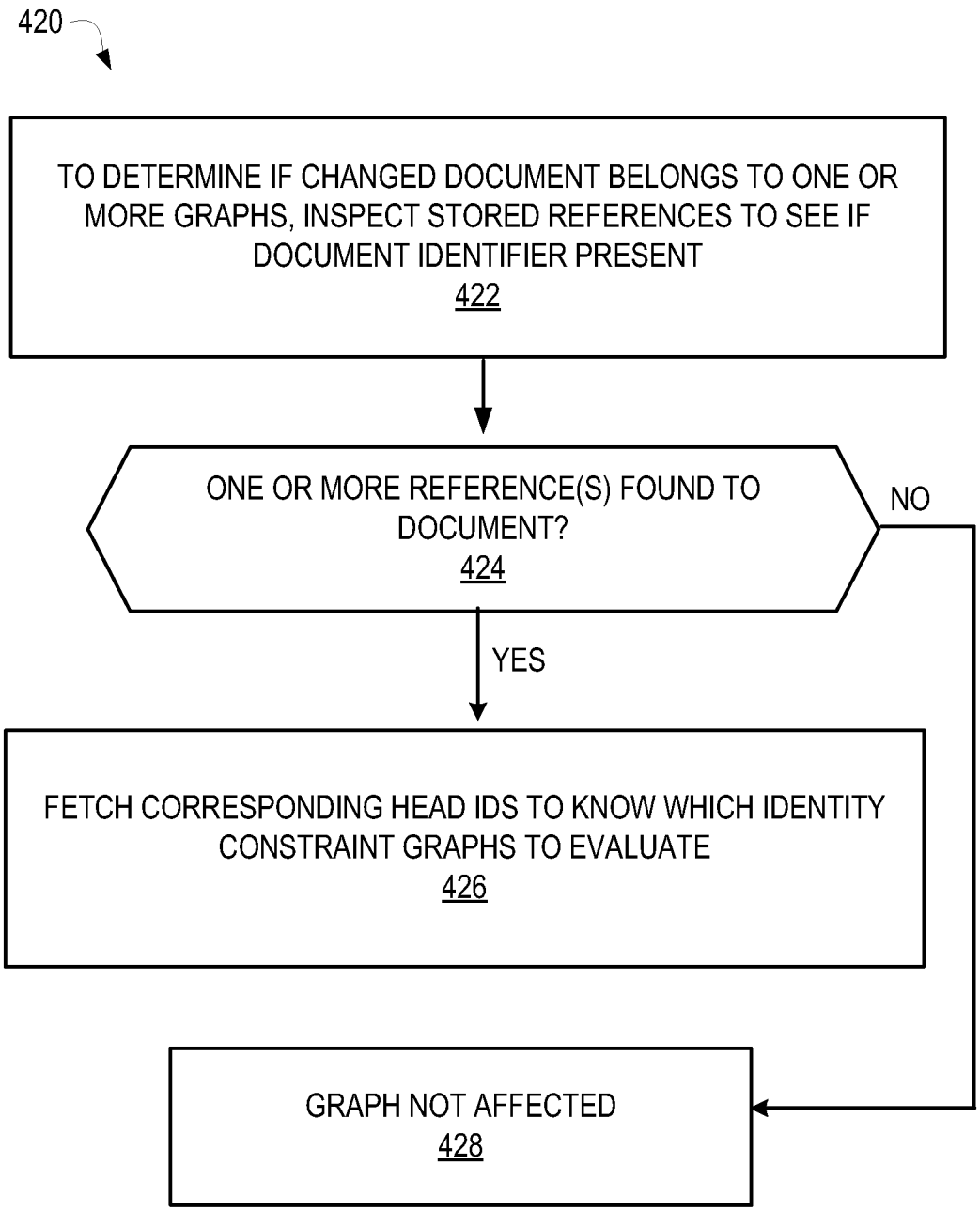
FIG. 9 is a process flow diagram for one implementation that illustrates the stages involved in determining whether a new or changed document affects an identity constraint graph.

FIG. 9 is a process flow diagram 420 for one implementation that illustrates the stages involved in determining whether a new or changed document affects an identity constraint graph. To determine if the change document belongs to the graph, the stored references are inspected to see if the document identifier is present (stage 422). If one or more references are found to the document (decision point 424), then the corresponding head element IDs are fetched so that the identity constraint graphs to be evaluated can be determined (stage 426). If a reference is not found to the document (decision point 424), then no graphs are affected (stage 428).

An example will be provided to further illustrate this concept. Reference will be made back to the identity constraint graph first introduced in FIG. 2. Assume that, documents s (158), m2 (162), t21 (170), t11 (164), t12 (166) and t13 (168) already exist in the data store. Further assume that document m1 (160) is being added in the current submit operation.

One question is how to determine that the identity constraint graph rooted at document s (158) needs to be evaluated when m1 (160) is added? One possible solution will now be described. Consider the state of the store prior to adding document m1. The identity constraint graph "s (158) to m2 (162) to t21 (170)" existed at that time. This means that the graph had been computed and evaluated at some prior submit with no violations found. If the graph had been stored at that time, that information could be used so that the graph does not need to be constructed again in this submit. In one implementation, this is exactly what can be done except that the associated metadata used during identity constraint evaluation is not stored. In one implementation, only the absolutely minimum information needed for determining whether this graph is affected is stored.

The following information is needed about each document node in the graph: the Id of the head element of that graph, as well as references that emanate from the document and that correspond to one of the selector tokens for the identity constraint associated with that graph.

Figure 10:
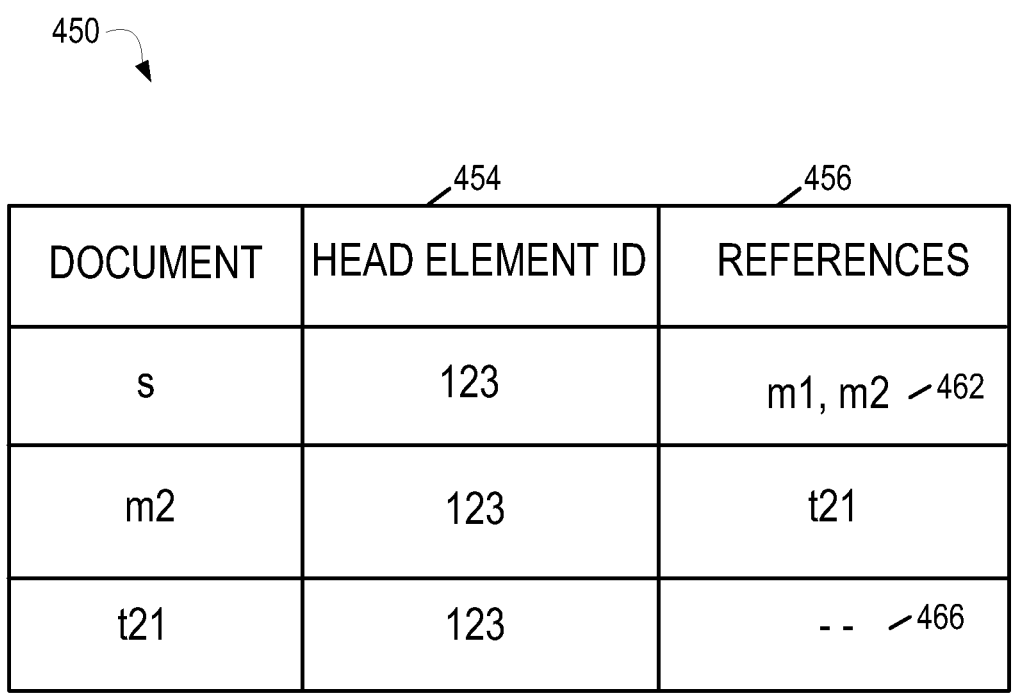
FIG. 10 is a diagrammatic view for one implementation that illustrates a tabular form of an exemplary identity constraint graph.

For the "s (158) to m2 (162) to t21 (170)" graph, this information is as shown in the table 450 of FIG. 10. A fictitious id 123 is used for the head element in document s. To determine if document m2 belongs to this graph, the References column 456 can be inspected to see if m2 appears in any row. If m2 is found in any row, the head element id is retrieved from the 'Head element id' column 454 so that the identity constraint graph to evaluate can be determined. In this example, m2 is present in the references column 456 at row 462.

In one implementation, one or more optimizations can be made to the table that stores this information. For example, in implementations that do not need to know which document points to m2, then the Document column is not stored. Since leaf level documents do not have any out-reference that participate in the graph, the leaf level rows, such as row 466, do not have to be stored.

As another example optimization that can be used will now be described. In one implementation, the paths stored in the 'References' column are stored as varchar(max). If the database server does not permit index on such a column, then a checksum column can be created and an index created on that column. Taking this a step further, if the rare chance involved in a checksum collision is acceptable, then the Reference column could be omitted altogether. In the rare case where there is a collision, an identity constraint will simply be evaluated unnecessarily. It is a tradeoff between the storage requirement for the Reference column and infrequently evaluating some identity constraint unnecessarily.

Figure 11:
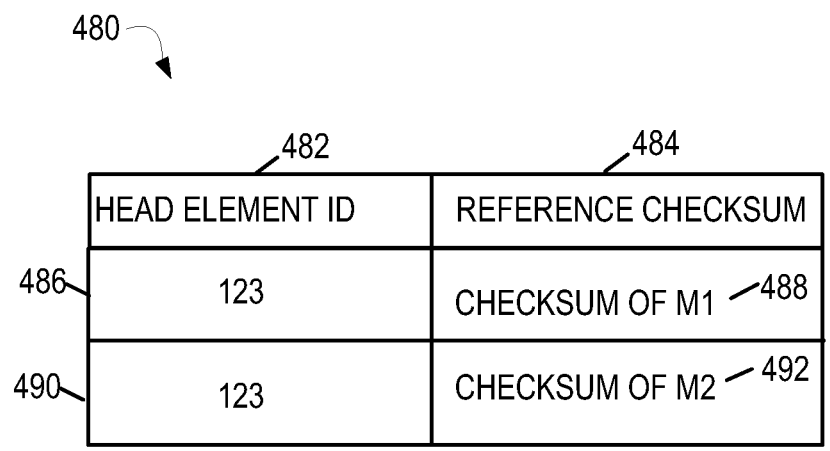

FIG. 11 is a diagrammatic view 480 for one the example implementation described that uses a checksum. This table can be utilized to determine which identity constraint graph a given document participates in. To determine if m2 participates in an identity constraint graph, checksum of the m2 path is computed and looked up in this table. The checksum of m2 matches checksum 492. The head element ID 490 from the same row is extracted. Thus, this indicates that the identity constraint graph rooted at head element 490 is affected due to a change to m2. In one implementation, using this technique, it can be quickly determined which identity constraint graph(s) a given document participates in.

Figure 12:
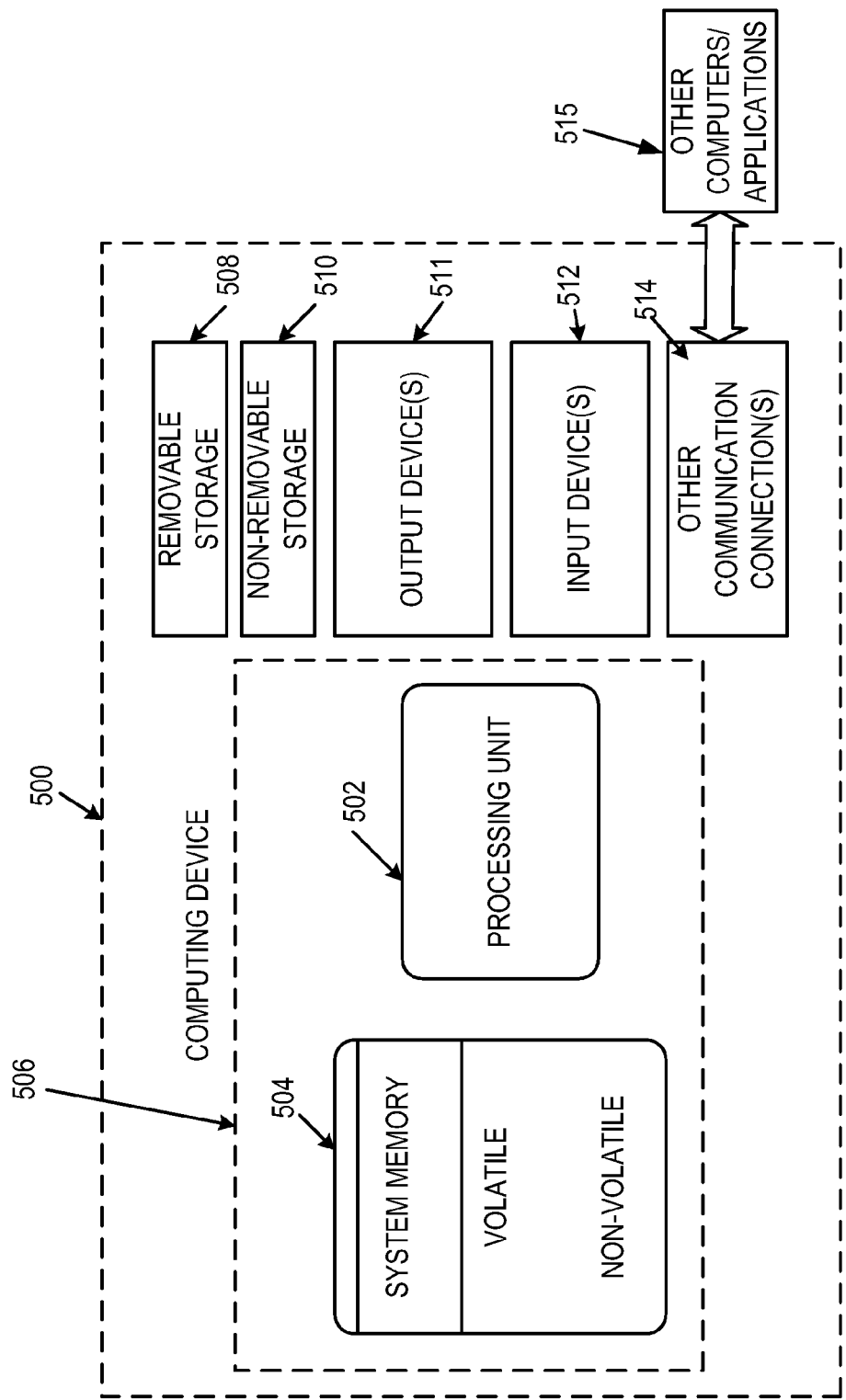
FIG. 12 is a diagrammatic view of a computer system of one implementation.

As shown in FIG. 12, an exemplary computer system to use for implementing one or more parts of the system includes a computing device, such as computing device 500. In its most basic configuration, computing device 500 typically includes at least one processing unit 502 and memory 504. Depending on the exact configuration and type of computing device, memory 504 may be volatile (such as RAM), non-volatile (such as ROM, flash memory, etc.) or some combination of the two. This most basic configuration is illustrated in FIG. 12 by dashed line 506.

Additionally, device 500 may also have additional features/functionality. For example, device 500 may also include additional storage (removable and/or non-removable) including, but not limited to, magnetic or optical disks or tape. Such additional storage is illustrated in FIG. 12 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 500. Any such computer storage media may be part of device 500.

Computing device 500 includes one or more communication connections 514 that allow computing device 500 to communicate with other computers/applications 515. Device 500 may also have input device(s) 512 such as keyboard, mouse, pen, voice input device, touch input device, etc. Output device(s) 511 such as a display, speakers, printer, etc. may also be included. These devices are well known in the art and need not be discussed at length here.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A method for identifying violations to identity constraints comprising the steps of:
    extracting values from an XML document to identify potential members of a target node set of Service Modeling Language (SML) documents by applying a last selector token xpath to a document root element;
    retrieving field instances of the target node set of documents by applying a field xpath to each member of the target node set, the field instances associated with the identity constraints, the identity constraint;

performing condition checks on each of the field instances, wherein the condition checks include ensuring that each field does not have more than one value, ensuring that each field is a simple type, and ensuring that each key-sequence is fully specified;

storing a result of each of the condition checks for later use during validation of identity constraints; and during identity constraint validation, performing a database query against the stored result of the condition checks to find any values that do not meet the condition checks by locating any rows corresponding to leaf nodes for an identity constraint graph indicative of a constraint violation, the identity restraint graph generated recursively from stored identity constraint reference information without accessing XML content of a plurality of documents participating in the identity restraint graph.

2. The method of claim 1, wherein the values are extracted from the XML document on a client submit operation.

3. The method of claim 1, wherein the result is stored in a bit-mask.

4. The method of claim 1, wherein the result is stored in a database.

* * * * *